: US 11,235,569 B2
(45) Date of Patent: Feb. 1, 2022

(54) INKJET RECORDING APPARATUS AND RECORDING METHOD

(71) Applicant: BROTHER KOGYO KABUSHIKI KAISHA, Nagoya (JP)

(72) Inventor: Masatomo Yamaguchi, Inazawa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/009,978

(22) Filed: Sep. 2, 2020

(65) Prior Publication Data

US 2021/0094279 A1    Apr. 1, 2021

(30) Foreign Application Priority Data

Sep. 30, 2019    (JP) .............................. JP2019-179121

(51) Int. Cl.
   *B41J 2/045*    (2006.01)
   *B41J 25/00*    (2006.01)

(52) U.S. Cl.
   CPC ....... *B41J 2/04536* (2013.01); *B41J 2/04586* (2013.01); *B41J 25/006* (2013.01)

(58) Field of Classification Search
   CPC ... B41J 2/04536; B41J 25/006; B41J 2/04586
   See application file for complete search history.

(56) References Cited

U.S. PATENT DOCUMENTS

2009/0251503 A1*  10/2009  Kashimoto ............ B41J 2/2128
                                                                  347/14
2020/0050908 A1*   2/2020  Ohara .................... B41J 2/2132

FOREIGN PATENT DOCUMENTS

JP    2005047168 A  *  2/2005  ............... B41J 3/04
JP    2010-211455 A     9/2010

* cited by examiner

*Primary Examiner* — Yaovi M Ameh
(74) *Attorney, Agent, or Firm* — Scully, Scott, Murphy & Presser, PC

(57) ABSTRACT

A controller determines: based on image data, whether both a code image and a non-code image are included in an image to be recorded in a passing region of a recording medium; and in response to determining that both images are included, during a first relative movement of a head, performs first separate recording processing of controlling the head and a motor to record at least part of a portion of the code image included in the passing region without recording a portion of the non-code image included in the passing region; and during a second relative movement which is performed after the first relative movement, performs second separate recording processing of controlling the head and the motor to record at least part of the portion of the non-code image included in the passing region without recording the portion of the code image included in the passing region.

10 Claims, 10 Drawing Sheets

INKJET RECORDING APPARATUS AND RECORDING METHOD

CROSS REFERENCE TO RELATED APPLICATIONS

This application claims priority from Japanese Patent Application No. 2019-179121 filed Sep. 30, 2019. The entire content of the priority application is incorporated herein by reference.

TECHNICAL FIELD

This disclosure relates to an inkjet recording apparatus and a recording method for recording a code image.

BACKGROUND

The standard for one-dimensional codes (bar codes) defines the ratio of the width of a bar and the space between two adjacent bars. If the ratio of the width of the bar and the space of the printed barcode image is out of the reference range, a reading error will occur. In order to prevent a reading error, when printing a barcode image on a recording medium such as paper, it is necessary to ensure the recording quality of the barcode image so that the ratio of the width of the bar and the space is within the reference range. This also applies to two-dimensional codes.

A barcode image may be recorded on one sheet together with a non-code image other than a barcode. For example, there is disclosed a label recording method in which product information including barcode information and on-demand information for recipes and/or menus related to the product are recorded together by an inkjet method.

SUMMARY

According to one aspect, this specification discloses an inkjet recording apparatus. The inkjet recording apparatus includes a head, a conveyor, a carriage, a motor, a memory, and a controller. The head is configured to eject ink onto a recording medium. The conveyor is configured to convey the recording medium in a first direction. The head is mounted on the carriage. The carriage is configured to reciprocate in a second direction perpendicular to the first direction. The motor is configured to drive the carriage to reciprocate in the second direction such that the head moves relative to the recording medium while facing the recording medium. The controller is configured to: determine, based on image data stored in the memory, whether both a code image and a non-code image are included in an image to be recorded in a passing region of the recording medium, the passing region being a region through which the head passes due to a relative movement of the head, the code image being formed by a plurality of recorded regions and a plurality of non-recorded regions, the non-code image being an image other than the code image; and in response to determining that both the code image and the non-code image are included in the image, during a first relative movement of the head, perform first separate recording processing of controlling the head and the motor to record at least part of a portion of the code image included in the passing region without recording a portion of the non-code image included in the passing region; and during a second relative movement of the head which is performed after the first relative movement, perform second separate recording processing of controlling the head and the motor to record at least part of the portion of the non-code image included in the passing region without recording the portion of the code image included in the passing region.

According to another aspect, this specification also discloses a recording method in an inkjet recording apparatus. The recording method includes: determining, based on image data stored in a memory of the inkjet recording apparatus, whether both a code image and a non-code image are included in an image to be recorded in a passing region of a recording medium, the inkjet recording apparatus including a head configured to eject ink onto the recording medium and a movement mechanism configured to cause at least the head or the recording medium to reciprocate in one direction such that the head moves relative to the recording medium while facing the recording medium, the passing region being a region through which the head passes due to a relative movement of the head, the code image being formed by a plurality of recorded regions and a plurality of non-recorded regions, the non-code image being an image other than the code image; and in response to determining that both the code image and the non-code image are included in the image, during a first relative movement of the head, performing first separate recording processing of controlling the head and the movement mechanism to record at least part of a portion of the code image included in the passing region without recording a portion of the non-code image included in the passing region; and during a second relative movement of the head which is performed after the first relative movement, performing second separate recording processing of controlling the head and the movement mechanism to record at least part of the portion of the non-code image included in the passing region without recording the portion of the code image included in the passing region.

According to still another aspect, this specification also discloses an inkjet recording apparatus. The inkjet recording apparatus includes a head, a conveyor, a motor, a memory, and a controller. The head is configured to eject ink onto a recording medium. The head extends in a width direction of the recording medium. The conveyor is configured to convey the recording medium in a conveyance direction. The conveyance direction is perpendicular to the width direction. The motor is configured to drive the conveyor to convey the recording medium in the conveyance direction such that the head moves relative to the recording medium while facing the recording medium. The controller is configured to: determine, based on image data stored in the memory, whether both a code image and a non-code image are included in an image to be recorded in an entirety of the recording medium, the code image being formed by a plurality of recorded regions and a plurality of non-recorded regions, the non-code image being an image other than the code image; and in response to determining that both the code image and the non-code image are included in the image, during a first relative movement of the head, perform first separate recording processing of controlling the head to record the code image while controlling the motor to convey the recording medium in a forward conveyance direction without recording the non-code image; and during a second relative movement of the head which is performed after the first relative movement, perform second separate recording processing of controlling the head to record the non-code image while controlling the motor to convey the recording medium in a reverse conveyance direction without recording the code image, the reverse conveyance direction being opposite the forward conveyance direction.

BRIEF DESCRIPTION OF THE DRAWINGS

Embodiments in accordance with this disclosure will be described in detail with reference to the following figures wherein.

DETAILED DESCRIPTION

When recording is performed using an inkjet printer, the paper may swell due to the landing of ink, and may cause deformation such as curling or local curving of the entire paper, which reduces the flatness of the paper. If such deformation causes variations in the distance between the paper and the head of the printer, variations in the ink landing accuracy depending on the position of the paper become large, resulting in deterioration of the recording quality. Therefore, when a barcode image and a non-code image are recorded together on one sheet of paper, and especially when the non-code image includes a high-duty image with a large amount of ink landed per unit area, the flatness of the paper may be decreased at the time of recording of the barcode image. As a result, the recording quality of the barcode image may be deteriorated and a reading error of the barcode may occur.

In view of the foregoing, an aspect of an object of this disclosure is to provide an inkjet recording apparatus and a recording method that, in a case where a code image and a non-code image are recorded together on the same recording medium, secure the recording quality of the code image.

A printer as an inkjet recording apparatus of embodiments of this disclosure will be described while referring to the accompanying drawings.

First Embodiment

Figure 1:
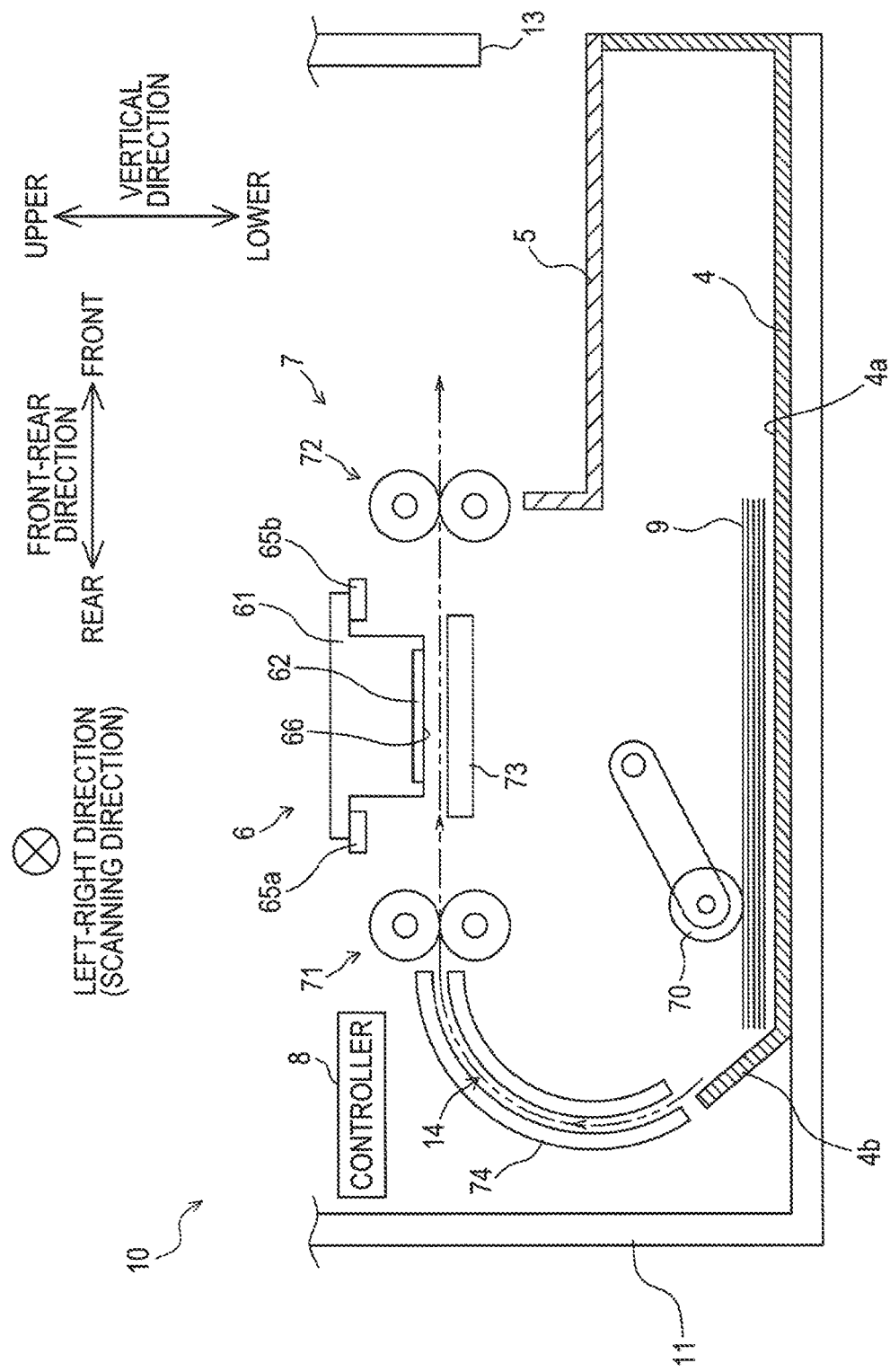
FIG. 1 is a schematic side view showing the internal structure of a printer according to a first embodiment of this disclosure.

First, a printer 10 according to a first embodiment will be described. As shown in FIG. 1, the printer 10 includes a paper feed tray 4, a paper discharge tray 5, a recording unit 6, a conveyance unit 7, and a controller 8. In the following description, a vertical direction is defined based on the state where the printer 10 is installed in a usable state (state of FIG. 1). A front-rear direction is defined assuming that the side where an opening 13 of a housing 11 is provided is the near side (front side). Further, a left-right direction is defined when viewed from the front side of the printer 10. The paper feed tray 4, the recording unit 6, the conveyance unit 7, and the controller 8 are housed in the housing 11 of the printer 10. The paper feed tray 4 is arranged below the recording unit 6 in the housing 11.

The paper feed tray 4 is configured to support and accommodate a plurality of sheets of paper 9 in a stacked state. The paper feed tray 4 is configured to be inserted into and removed from the housing 11 in the front-rear direction. The paper feed tray 4 has a support surface 4 that supports the paper 9. An inclined plate 4b is provided at the rear end of the paper feed tray 4.

The paper discharge tray 5 accommodates the paper 9 on which an image is recorded by a head 62 of the recording unit 6 described later. The paper discharge tray 5 is arranged above the front side of the paper feed tray 4, and is configured to move as the paper feed tray 4 is inserted into and removed from the housing 11.

The recording unit 6 includes a carriage 61 and the head 62. The carriage 61 is supported by two guide rails 65a and 65b. The two guide rails 65a and 65b are arranged to be separated from each other in the front-rear direction, and each of the guide rails 65a and 65b extends in the left-right direction. The carriage 61 is arranged to straddle the two guide rails 65a and 65b. The carriage 61 is driven by a carriage motor 31 (see FIG. 2) so as to reciprocate along the two guide rails 65a and 65b in the left-right direction which is the scanning direction. The head 62 is mounted on the carriage 61 and reciprocates in the scanning direction together with the carriage 61. The head 62 ejects ink supplied from four ink cartridges (not shown) that store ink of four colors (black, cyan, magenta, and yellow) from nozzles (not shown) provided on a nozzle surface 66 on the lower surface thereof, thereby recording an image on paper 9. That is, the printer 10 in this embodiment is an inkjet serial printer capable of recording a color image.

The conveyance unit 7 conveys the paper 9 inside the printer 10, and includes a paper feed roller 70, a pair of conveyance rollers 71, a pair of discharge rollers 72, a platen 73, and a guide member 74. The paper feed roller 70 is disposed above the paper feed tray 4, and is rotated by being applied with a driving force from a paper feed motor 32 (see FIG. 2), thereby sending the paper 9 accommodated in the paper feed tray 4 rearward. The pair of conveyance rollers 71 and the pair of discharge rollers 72 are arranged to sandwich the recording unit 6 in the front-rear direction. The pair of conveyance rollers 71 is arranged at the rear of the recording unit 6, and the pair of discharge rollers 72 is arranged at the front of the recording unit 6. The pair of conveyance rollers 71 sends the paper 9 to a region facing the nozzle surface 66 of the head 62. The pair of discharge rollers 72 receives the paper 9 sent by the pair of conveyance rollers 71, and discharges the paper 9 to the paper discharge tray 5. The pair of conveyance rollers 71 and the pair of discharge rollers 72 are driven to rotate by a conveyance motor 33 (see FIG. 2).

The platen 73 is arranged below the recording unit 6 so as to face the nozzle surface 66 of the recording unit 6. The guide member 74 defines a conveyance path 14 for sending the paper 9 sent out from the paper feed tray 4 by the paper feed roller 70 to a region facing the nozzle surface 66 of the head 62. The guide member 74 extends from a position near the rear end of the paper feed tray 4 to a position near the pair of conveyance rollers 71.

The paper 9 fed rearward from the paper feed tray 4 by the paper feed roller 70 is directed obliquely upward by the inclined plate 4b provided at the rear end of the paper feed tray 4, passes through the conveyance path 14 defined by the guide member 74, and reaches a position where the paper 9 is nipped by the pair of conveyance rollers 71. The paper 9 nipped by the pair of conveyance rollers 71 is conveyed to a region facing the nozzle surface 66 of the head 62 by the rotation of the pair of conveyance rollers 71. In a state where the paper 9 conveyed by the pair of conveyance rollers 71 is supported by the platen 73, ink is ejected from nozzles (not shown) provided on the nozzle surface 66 of the head 62 that moves in the scanning direction so that an image is recorded on the paper 9. The paper 9 on which the image is recorded is conveyed forward by the pair of discharge rollers 72 and is discharged onto the discharge tray 5. Here, as shown by the double-dot chain line arrow in FIG. 1, the direction in which the paper 9 fed rearward from the paper feed tray 4 passes through the conveyance path 14 defined by the guide member 74 and passes the pair of conveyance rollers 71, the area facing the nozzle surface 66 of the head 62, and the pair of discharge rollers 72 in this order is defined as a conveyance direction.

Figure 2:
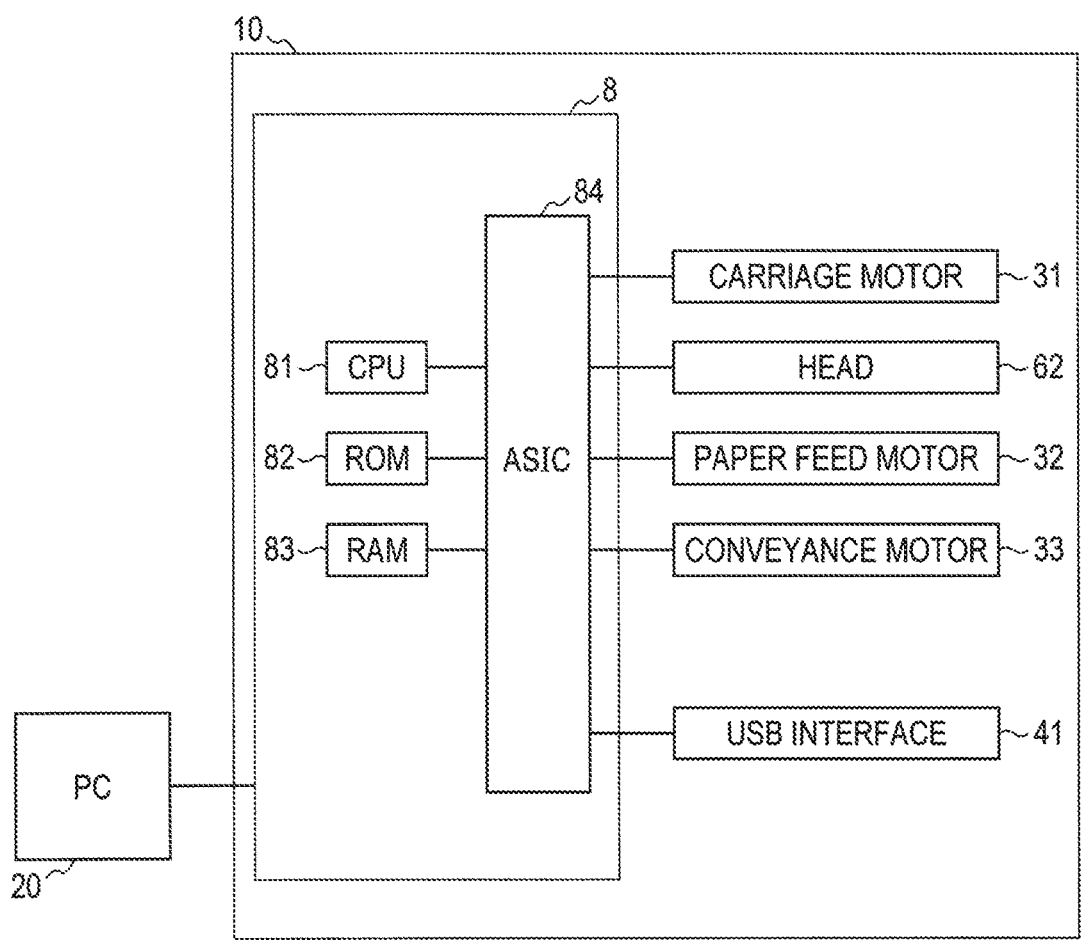
FIG. 2 is a block diagram schematically showing the electrical configuration of the printer shown in FIG. 1 and a PC connected to the printer.

The controller 8 controls the entire printer 10, and as shown in FIG. 2, the carriage motor 31, the head 62, the paper feed motor 32, the conveyance motor 33, and so on are electrically connected. Further, a USB interface 41 is electrically connected to the controller 8. The USB interface 41 is a USB standard interface and can be connected to a USB memory as a removable memory. In addition, a PC (Personal Computer) 20 that is an external device is connected to the controller 8 of the printer 10. The printer 10 and the PC 20 may be connected through a LAN (Local Area Network), or may be connected not through the LAN. Further, the data transmission/reception between the printer 10 and the PC 20 may be performed by wireless communication or wired communication. It is also possible to wirelessly connect a portable terminal such as a smartphone to the printer 10 through a LAN or directly.

The controller 8 includes a CPU (Central Processing Unit) 81, a ROM (Read Only Memory) 82, a RAM (Random Access Memory) 83, an ASIC (Applicant Specific Integrated Circuit) 84, and so on. The ROM 82 stores programs executed by the CPU 81 and the ASIC 84, various fixed data, and so on. The RAM (an example of memory) 83 temporarily stores data (image data and so on) necessary for executing the programs. At least part of the ROM 82 is an electrically erasable and rewritable EEPROM (Electrically Erasable Programmable Read-Only Memory). The PC 20 has a CPU, a ROM, a RAM, and an HDD (Hard Disk Drive), which are not shown. An OS (Operation System) and a printer driver are installed in the HDD. The CPU controls the operation of the printer 10 by executing the printer driver. The printer driver may be also installed in the ROM of the mobile terminal.

When image data is inputted from a USB memory connected to the USB interface 41 or from the PC 20, the controller 8 causes the CPU 81 and the ASIC 84 to execute recording processing based on the program stored in the ROM 82. With this operation, the image 50 related to the image data is recorded on the paper 9. In the recording processing, the controller 8 controls driving of the carriage motor 31 and the head 62 so as to perform a pass recording operation of ejecting ink from the nozzles (not shown) of the head 62 while moving the carriage 61 in the scanning direction based on image data stored in the RAM 83. Further, the controller 8 controls driving of the conveyance motor 33 such that, after the pass recording operation is performed twice, the conveyance unit 7 performs conveyance processing of conveying the paper 9 by a particular distance in the conveyance direction. In the printer 10 according to this embodiment, in order to record the image 50 relating to inputted image data on the paper 9, the recording processing of performing the pass recording operation and the conveyance processing are repeatedly executed.

Figure 3A:
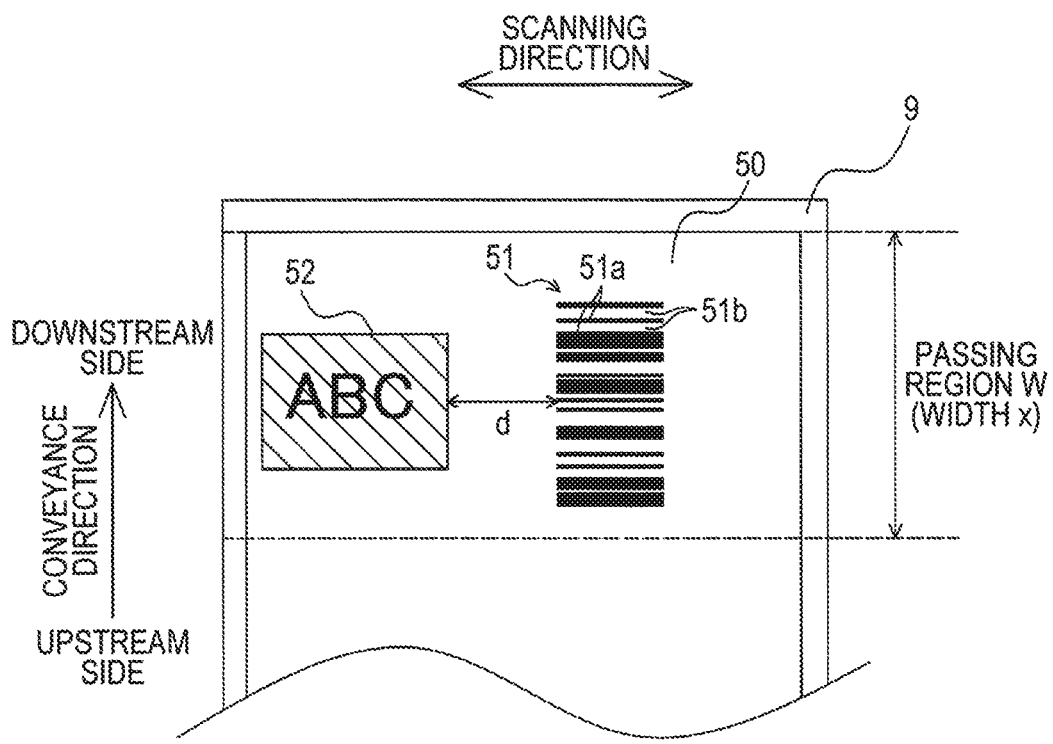
FIG. 3A is a diagram showing a state in which both a code image and a non-code image are included in a head passing region on paper.
Figure 3B:
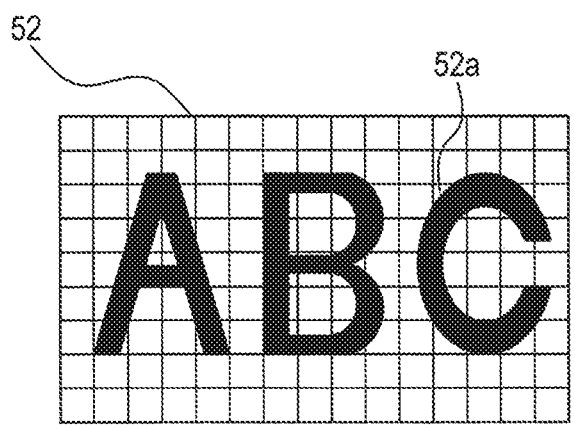
FIG. 3B is a diagram showing a plurality of sections forming the non-code image in FIG. 3A.

Next, image data in the present embodiment will be described. The present embodiment is directed to image data of an image 50 including a code image 51 (see FIGS. 3A and 3B) including a plurality of recorded regions 51a and a plurality of non-recorded regions 51b and an image (hereinafter referred to as a non-code image 52) other than the code image 51. As shown in FIGS. 3A and 3B, the code image 51 of the present embodiment is a one-dimensional code image in which an arrangement direction of the recorded regions 51a is parallel to the conveyance direction of the paper 9. However, the code image 51 may be a one-dimensional code image in which the arrangement direction of the recorded regions 51a is perpendicular to the conveyance direction of the paper 9. Moreover, the code image 51 may be a two-dimensional code image in which a plurality of square print regions is disposed in a mosaic pattern in a square region including sides extending in the vertical direction and sides extending in the horizontal direction.

Figure 4:
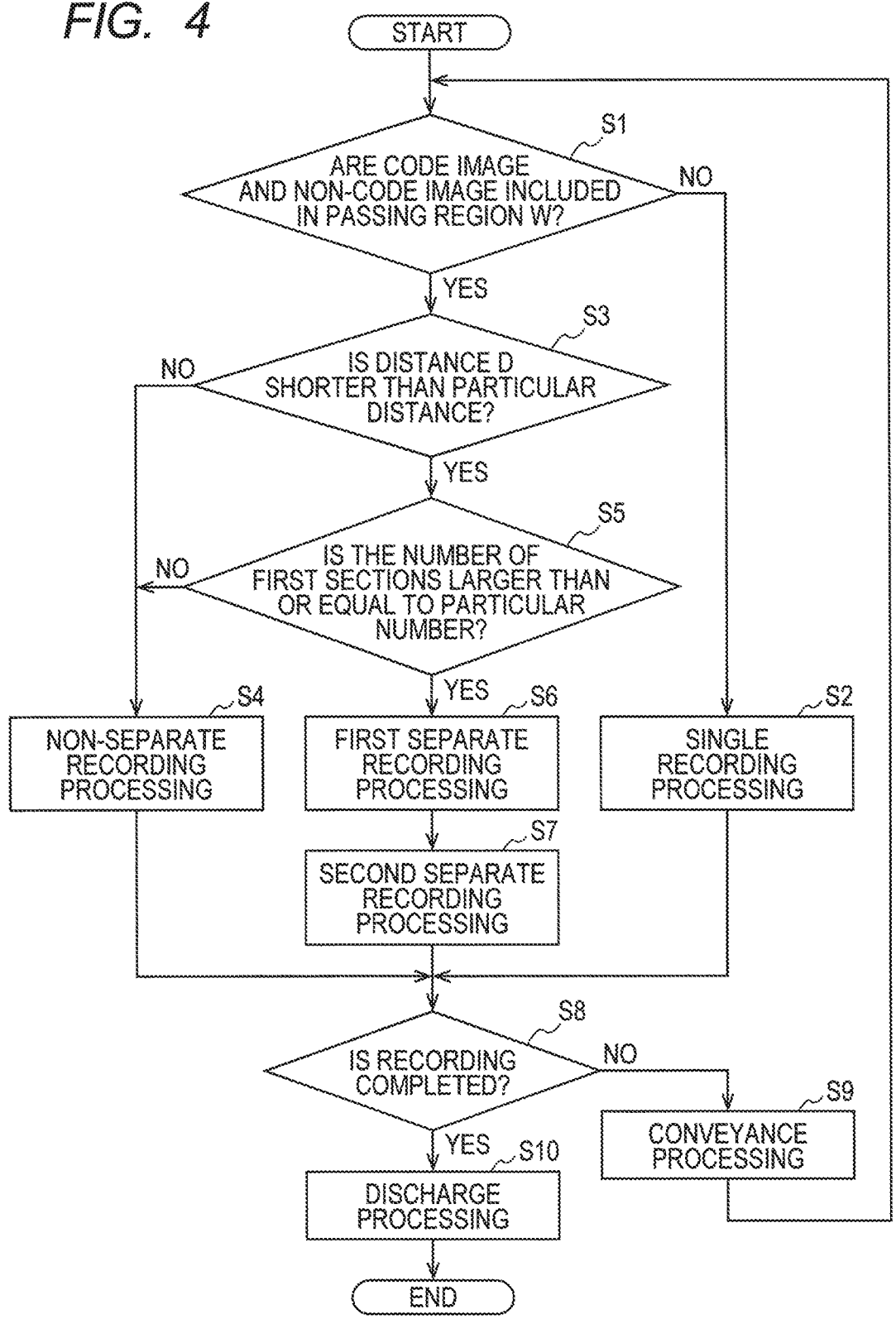
FIG. 4 is a flowchart showing the operation of the inkjet printer according to the first embodiment.

Next, an operation when the printer 10 according to the first embodiment records the image 50 on the paper 9 will be described with reference to the flowchart of FIG. 4. The controller 8 performs the following operations when image data is inputted from the PC 20 and so on connected to the printer 10. First, the controller 8 executes first determination processing of determining whether both the code image 51 and the non-code image 52 are included in an image to be recorded in a region (hereinafter a passing region W) having a width x equal to a length along the conveyance direction (more specifically, the distance between the most upstream nozzle and the most downstream nozzle formed in the nozzle surface 66 of the head 62 in the conveyance direction) through which the head 62 passes with a reciprocating movement of the carriage 61 in the scanning direction with respect to the paper 9 (step S1) (hereinafter, "step" will be abbreviated as "S"). In response to determining that the image to be recorded in the passing region W does not include both the code image 51 and the nonce code image 52 (S1: NO), the controller 8 executes single recording processing of recording either one of the code image 51 or the non-code image 52 in the passing region W of the head 62 on the paper 9 by performing a pass recording operation (S2). When neither the code image 51 nor the non-code image 52 is included in the passing region W, the recording of an image on the paper 9 is not performed, but such a case is also included in the single recording processing.

As shown in FIG. 3A, in response to determining that both the code image 51 and the non-code image 52 are included in the image to be recorded in the passing region W (S1: YES), the controller 8 performs distance derivation processing of deriving (calculating) a distance d between the code image 51 and the non-code image 52 (specifically, the shortest distance connecting an arbitrary point on an outer edge of the code image 51 and an arbitrary point on an outer edge of the non-code image 52) to be recorded in the passing region W based on analysis of the image data related to the image 50. The controller 8 then determines whether the distance d is smaller than a particular value (S3). In response to determining that the distance d is larger than or equal to the particular value (S3: NO), the controller 8 executes non-separate recording processing of recording both the code image 51 and the non-code image 52 in the passing region W of the paper 9 by performing a pass recording operation (S4).

In response to determining that the distance d is smaller than the particular value (S3: YES), as shown in FIG. 3B, the controller 8 executes landing amount determination processing of determining whether there are a particular number or more of first sections 52a (part of square sections including portions in which a character string "ABC" is recorded in FIG. 3B) in which the ink landing amount is larger than or equal to a particular amount among a plurality of square sections divided into a grid pattern forming the non-code image 52 to be recorded in the passing region W (S5). In response to determining in the landing amount determination processing that the number of first sections 52a is smaller than the particular number (S5: NO), the controller 8 executes the non-separate recording processing (S4).

In response to determining in the landing amount determination processing that the number of first sections 52a is larger than or equal to the particular number (S5: YES), the controller 8 executes first separate recording processing of recording an entirety of the portion of the code image 51 included in the passing region W on the paper 9 and not recording the non-code image 52 in the passing region W of the paper 9 by performing a pass recording operation (S6). After the code image 51 is recorded in the passing region W of the paper 9, the controller 8 executes second separate recording processing of recording an entirety of the portion of the non-code image 52 included in the passing region W on the paper 9 and not recording the code image 51 in the passing region W of the paper 9 by performing a pass recording operation (S7).

As examples of the pass recording operations in S6 and S7, in a case where an image is recorded in both forward and reverse movements of the carriage, the first separate recording processing is executed in a forward movement of the carriage and the second separate recording processing is executed in a reverse movement of the carriage. In a case where an image is recorded only in forward movements of the carriage, the first separate recording processing is executed in a forward movement of the carriage, the carriage is returned to the start position, and then and the second separate recording processing is executed in the next forward movement of the carriage.

After an image is recorded in the passing region W of the paper 9 in any one of the single recording processing (S2), the non-separate recording processing (S4), the first separate recording processing (S6), and the second separate recording processing (S7), the controller 8 determines whether the recording of the image 50 based on the input image data on the paper 9 is completed (S8). In response to determining that the recording of the image 50 is not completed (S8: NO), the controller 8 executes conveyance processing of conveying the paper 9 by a distance corresponding to the width x of the passing region W in the conveyance direction (S9) and returns to S1. In the first determination processing (S1) executed subsequently to the conveyance processing (S9), it is determined whether both the code image 51 and the non-code image 52 are included in a new passing region (not shown) shifted toward the downstream side in the conveyance direction by the distance x from the passing region W.

In response to determining that the recording of the image 50 is completed (S8: YES), the controller 8 executes discharge processing of discharging the paper 9 to the discharge tray 5 by the pair of discharge rollers 72 (S10). In this way, the operation of the printer 10 recording the image 50 on the paper 9 according to the first embodiment ends.

The particular value in S3 is a value stored in advance in the ROM 82 of the controller 8. By determining in S3 whether the distance d is smaller than the particular value, the controller 8 determines whether to execute the landing amount determination processing (S5) or to execute the non-separate recording processing (S4). The larger the particular value, the higher the possibility that the distance d is smaller than the particular value, and the lower the possibility that the non-separate recording processing of recording the code image 51 and the non-code image 52 at the same time will be executed. Therefore, from the viewpoint of securing recording quality of the code image 51, a large particular value is preferable. On the other hand, the smaller the particular value, the higher the possibility that the distance d will be larger than or equal to the particular value and the higher the possibility that the non-separate recording processing will be executed. Therefore, from the viewpoint of suppressing a decrease in a recording speed of the image 50, a small particular value is preferable. Therefore, the particular value is set appropriately by the user according to the user's needs depending on which one of the recording quality of the code image 51 or the recording speed of the image 50 will be prioritized and is stored in the ROM 82.

The particular amount and the particular number in S5 are values stored in advance in the ROM 82 of the controller 8. By determining whether the number of first sections 52a is larger than or equal to the particular number, the controller 8 determines whether to execute the first and second separate recording processing (S6 and S7) or to execute the non-separate recording processing (S4). The first section 52a is a section in which the ink landing amount is larger than or equal to the particular amount among the plurality of sections forming the non-code image 52. Since the smaller the particular amount, the more likely a section having a small ink landing amount is recognized as the first section 52a, the number of first sections 52a tends to increase. On the other hand, when the particular amount is large, the opposite is true and the number of first sections 52a tends to decrease. That is, the smaller the particular amount and the smaller the particular number, the higher the possibility that the number of first sections 52a is larger than or equal to the particular number and the lower the possibility that the non-separate recording processing is executed. Therefore, from the viewpoint of securing the recording quality of the code image 51, it is preferable that the particular amount is small and the particular number is small. On the other hand, the larger the particular amount and the larger the particular number, the higher the possibility that the number of first sections 52a is smaller than the particular number and the higher the possibility that the non-separate recording processing is executed. Therefore, from the viewpoint of suppressing a decrease in the recording speed of the image 50, it is preferable that the particular amount is large and the particular number is large. Therefore, the particular amount and the particular number are set appropriately by the user according to the user's needs depending on which one of the recording quality of the code image 51 or the recording speed of the image 50 will be prioritized and are stored in the ROM 82.

If the non-code image 52 in which a plurality of first sections 52a are disposed adjacently or closely to each other is compared with the non-code image 52 in which a plurality of first sections 52a are disposed in a distributed manner, and if the number of the first sections 52a is the same, it is considered that the former non-code image 52 deforms the paper 9 greatly. That is, it is considered that the non-code image 52 in which a plurality of first sections 52a are disposed adjacently or closely to each other has a larger influence on the recording quality of the code image 51. Therefore, the particular amount and the particular number may be set to vary depending on the degree of adjacency or closeness of the first sections 52a.

According to the present embodiment, when both the code image 51 and the non-code image 52 are included in the image to be recorded in the passing region W of the head 62 on the paper 9, the code image 51 is recorded first and the non-code image 52 is recorded subsequently. Therefore, at a time point at which the code image 51 is recorded, the paper 9 will not be deformed due to the recording of the non-code image 52 in the passing region W of the head 62. In this way, when both the code image 51 and the non-code image 52 are recorded on the same paper 9, the recording quality of the code image 51 can be secured. In the present embodiment, the distance d between the recorded code image 51 and the recorded non-code image 52 in the passing region W and the number of first sections 52a in which the ink landing amount in the non-code image 52 is larger than or equal to the particular amount are derived. When the distance d is smaller than the particular value and the number of first sections 52a is larger than or equal to the particular number, the influence of the recording of the non-code image 52 on the recording quality of the code image 51 increases. In this case, by executing the first and second separate recording processing, the recording quality of the code image 51 can be secured. On the other hand, when the distance d is larger than or equal to the particular value or the number of first sections 52a is smaller than the particular number, the influence of the recording of the non-code image 52 on the recording quality of the code image 51 is small. In this case, by executing the non-separate recording processing with a high recording speed, a decrease in the recording speed can be avoided.

According to the present embodiment, so-called serial recording is executed in such a way that a pass recording operation of discharging ink from the head 62 while moving the carriage 61 in the scanning direction is performed in the first and second separate recording processing, and the paper 9 is conveyed in the conveyance direction in the conveyance processing. Therefore, it is possible to execute the first and second separate recording processing without conveying the paper 9 in a reverse direction of the conveyance direction. It is determined at every two pass recording operations whether both the code image 51 and the non-code image 52 are included in the passing region W. Therefore, it is possible to determine whether to execute the first and second separate recording processing or to execute the non-separate recording processing, as necessary. Therefore, a decrease in the recording speed can be suppressed while securing the recording quality of the code image.

According to the present embodiment, in the first and second separate recording processing, the non-separate recording processing, or the single recording processing, the entirety of the portions included in the passing region W of the code image 51 and the non-code image 52 are recorded. Therefore, it is not necessary to perform the pass recording operation multiple times with respect to the passing region W when each recording processing is executed. In the conveyance processing, the paper 9 is conveyed in the conveyance direction by the distance corresponding to the width x of the passing region W along the conveyance direction. This minimizes the number of times the conveyance processing is repeated to record the image 50 on the paper 9. In this way, a decrease in the recording speed can be further suppressed.

Second Embodiment

Next, a second embodiment in which various changes are made to the first embodiment will be described. Here, components having the same configurations as those in the first embodiment are designated by the same reference numerals, and the description thereof will be omitted.

The recording quality of the code image is influenced by the recording of the non-code image that has already been recorded on the downstream side in the conveyance direction as well as the recording of the non-code image in the same passing region of the head 62. Particularly, when a recording start position (the downstream end position) in the conveyance direction of the code image in the passing region of the head 62 is adjacent to the upstream end position in the conveyance direction of the non-code image that has already been recorded on the paper 9, deformation of the paper 9 by the recording of the non-code image has a large influence on the recording quality of the code image.

Figure 5A:
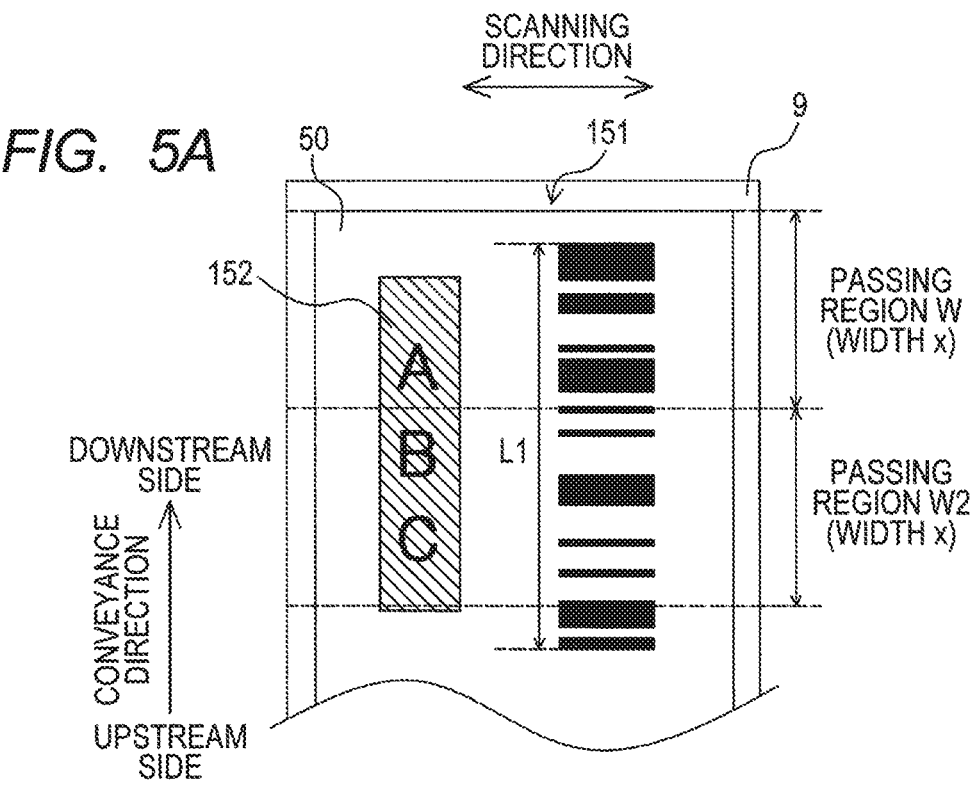
FIG. 5A is a diagram showing a case in which the length of a code image recorded on paper along a conveyance direction is larger than the width of a passing region along the conveyance direction.
Figure 5B:
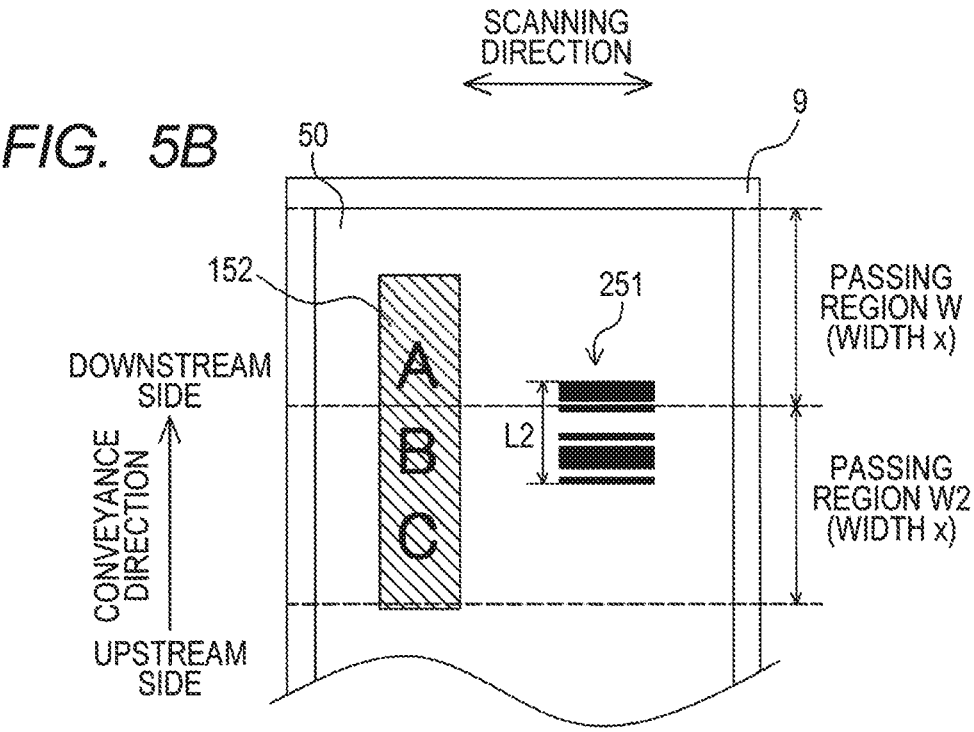
FIG. 5B is a diagram showing a case in which a code image is recorded over two passing regions on paper.

For example, as shown in FIG. 5A, when a length L1 along the conveyance direction of a code image 151 to be recorded on the paper 9 is larger than the width x in the conveyance direction of the passing region W of the head 62 on the paper 9, it is necessary to perform a plurality of pass recording operations and a plurality of conveyance processing in order to record the entire length of the code image 151. In this case, in the first embodiment, in the first and second separate recording processing, the entirety of the portions included in the passing region W of the code image 151 and the non-code image 152 are recorded on the paper 9. After that, the paper 9 is conveyed in the conveyance direction by the distance corresponding to the width x along the conveyance direction of the passing region W, in this case, a recording start position (the downstream end position) along the conveyance direction of the code image 151 in the passing region W2 after the paper 9 is conveyed by the distance of the width x of the passing region W is adjacent (close) to the upstream end position along the conveyance direction of the non-code image 152 that has already been recorded on the paper 9 in the passing region W. As shown in FIG. 5B, the same goes for the case where a length L2 of a code image 251 along the conveyance direction is smaller than the width x, but the code image 251 is recorded across the passing region W and the passing region W2 of the head 62 on the paper 9. That is, the recording start position along the conveyance direction of the code image 251 in the passing region W2 is adjacent (close) to the upstream end position along the conveyance direction of the non-code image 152 that has already been recorded on the paper 9 in the passing region W.

Figure 7:
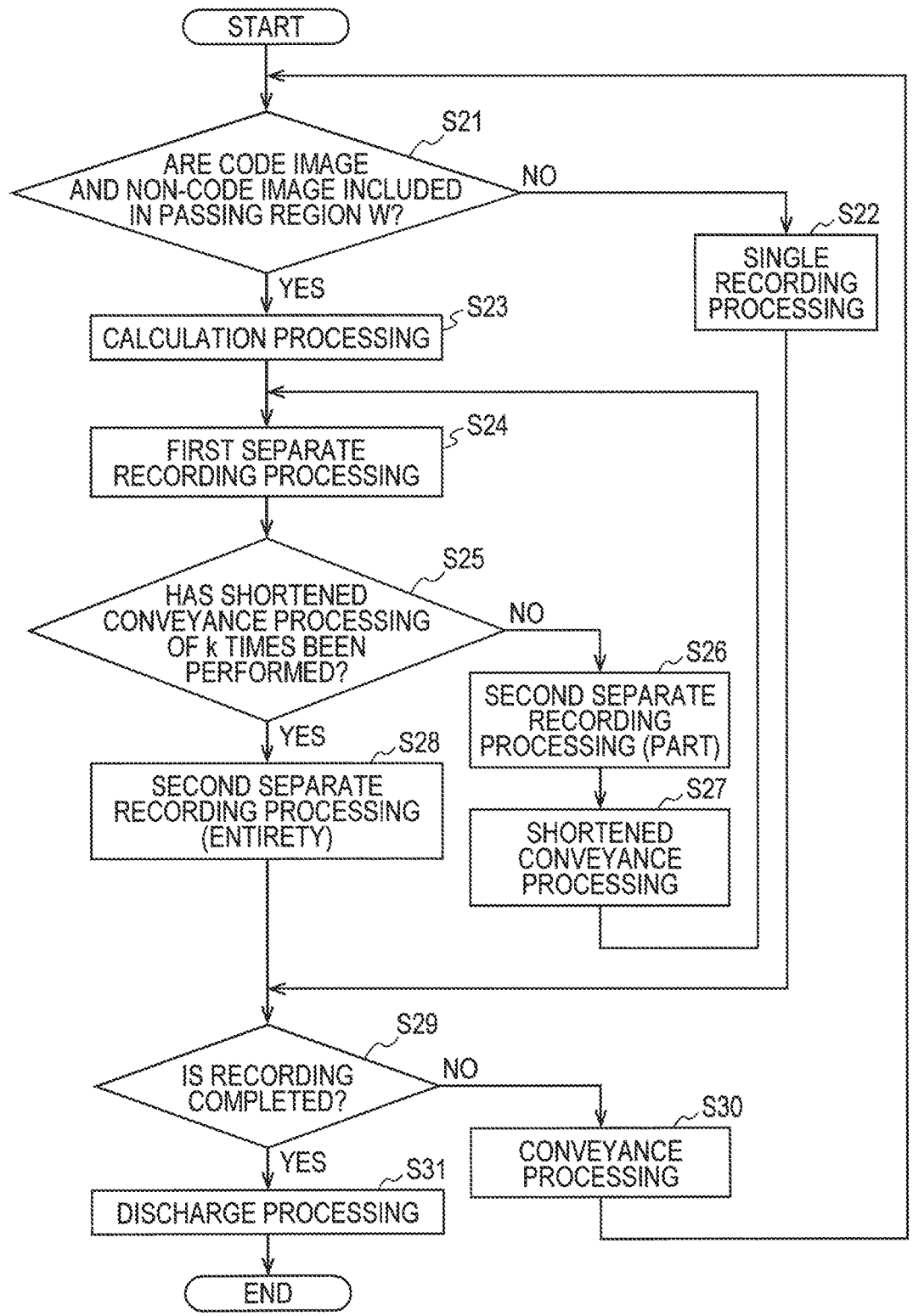
FIG. 7 is a flowchart showing the operation of an inkjet printer according to the second embodiment.

Therefore, in the present embodiment, in order to secure the recording quality of the code image, only a part of the non-code image 152 in the passing region is recorded, and the conveyance distance of the paper 9 is shorter than the width x of the passing region W. Hereinafter, a specific example of the above-described content will be described with reference to the flowchart of FIG. 7.

First, the controller 8 executes first determination processing of determining whether both the code image 151 and the non-code image 152 are included in an image to be recorded in the passing region W of the paper 9 (S21). In response to determining that the image to be recorded in the passing region W does not include both the code image 151 and the non-code image 152 (S21: NO), the controller 8 executes single recording processing of recording either one of the code image 151 or the non-code image 152 in the passing region W of the paper 9 by performing a pass recording operation (S22). When neither the code image 151 nor the non-code image 152 is included in the passing region W, the recording of an image on the paper 9 is not performed, but such a case is also included in the single recording processing.

Figure 6A:
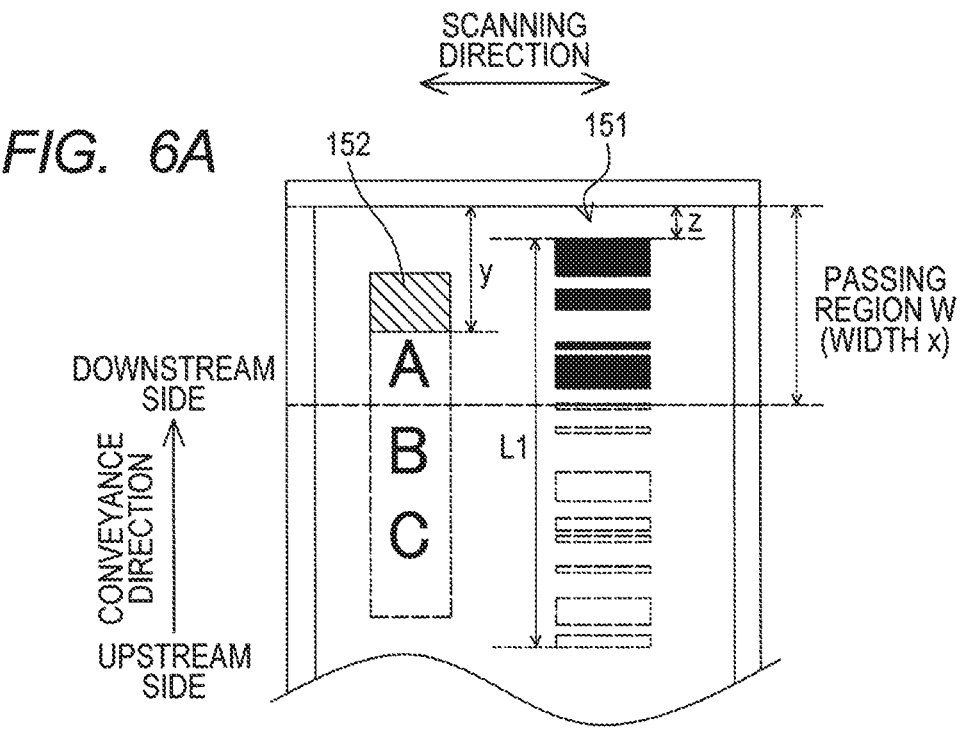
FIG. 6A is a diagram showing an image recorded on a passing region W on paper by an inkjet printer according to a second embodiment.

In response to determining that both the code image 151 and the non-code image 152 are included in the image to be recorded in the passing region W (S21: YES), the controller 8 executes calculation processing of calculating the number of times k (k is an integer larger than or equal to zero) and a conveyance distance y (S23). The number of times k is the number of times of performing conveyance processing (hereinafter, referred to as "shortened conveyance processing") performed from the start to the end of the recording of the code image 151. The conveyance distance y is a conveyance distance in one shortened conveyance processing. The number of times k of the shortened conveyance processing is obtained by calculating the smallest number of times in which the conveyance distance y is smaller than the width x of the passing region W based on the length L1 of the code image 151 along the conveyance direction, the width x of the passing region W along the conveyance direction, and the distance z between the recording start position (the downstream end position) of the code image 151 and the downstream end of the passing region. The conveyance distance y is a smallest conveyance distance within a range where the number of times k of the shortened conveyance processing is the smallest number of times. As shown in FIG. 6A, the entire length of the code image 151 can be recorded when the recording start position of the code image 151 along the conveyance direction is separated by the distance z from the downstream end of the passing region W, and the sum of the distance z and the length L1 of the code image 151 along the conveyance direction is smaller than or equal to the sum of the width x of the passing region W and the total conveyance distance ky of the k times of conveyance processing. That is, the conveyance distance y is the smallest value satisfying an inequality "L1+z≤ky+x".

A specific example for calculating the number of times k of shortened conveyance processing and the conveyance distance y in the shortened conveyance processing of one time in the example of FIGS. 6A and 6B will be described. The length L1+z−x of the unrecorded portion (dashed line portion) of the code image 151 in FIG. 6A is greater than the width x and is smaller than twice the width x. Thus, k=2 is obtained. Then, the above inequality "L1+z≤ky+x" is transformed into "y≥(L1+z−x)/k=(L1+z−x)/2". Because the conveyance distance y is the minimum value satisfying this inequality, y=(L1+z−x)/2 is obtained.

After the number of times k of the shortened conveyance processing and the conveyance distance y are calculated by the calculation processing, as shown in FIG. 6A, the controller 8 executes first separate recording processing of recording the entirety of the portion of the code image 151 included in the passing region and not recording the non-code image 152 in the passing region W of the paper 9 by performing a pass recording operation (S24). After the code image 151 is recorded in the passing region W of the paper 9, the controller 8 determines whether the k times of shortened conveyance processing calculated by the calculation processing of S23 have been executed (S25).

In response to determining that k times of shortened conveyance processing have not been executed (S25: NO), the controller 8 executes second separate recording processing of recording a part of the non-code image 152 included in the passing region W on the paper 9 and not recording the code image 151 in the passing region W of the paper 9 by performing a pass recording operation (S26). In this case, as shown in FIG. 6A, the controller 8 records a part of the non-code image 152 included in the passing region W on the paper 9 so that the distance between the upstream end of the non-code image 152 in the conveyance direction and the downstream end of the passing region W is the same as the shortened conveyance distance y.

Figure 6B:
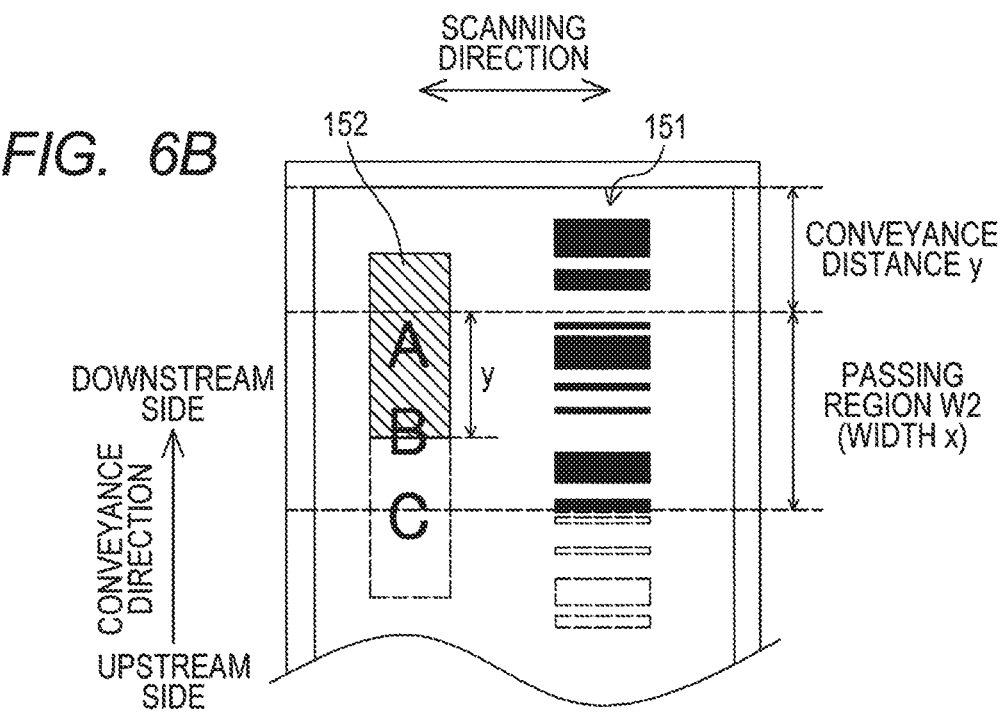
FIG. 6B is a diagram showing an image recorded on a passing region W2 after conveyance of paper.

After that, as shown in FIG. 6B, the controller 8 executes shortened conveyance processing of conveying the paper 9 along the conveyance direction by the distance y (S27). After the paper 9 is conveyed, the flow returns to S24, and the controller 8 executes the first separate recording processing (S24) again in the passing region W2 shown in FIG. 6B. In the first separate recording processing executed at that time, the entirety of the non-recorded portion of the code image 151 corresponding to the distance y from the upstream end of the passing region W2 in the conveyance direction is recorded. In the second separate recording processing of S26 executed again through S25, a part of the non-recorded portion of the non-code image 152 corresponding to the distance x of the passing region W2 (specifically, only a part corresponding to the distance y from the downstream end of the passing region W2) is recorded.

In response to determining that k times of shortened conveyance processing have been executed (S25: YES), the controller 8 executes the second separate recording processing of recording the entirety of the portion of the non-code image 152 included in the passing region after the k times of shortened conveyance processing have been executed on the paper 9 (S28). With this operation, the upstream end of the code image 151 and the upstream end of the non-code image 152 recorded on the paper 9 are at the same position in the conveyance direction.

After the image is recorded on the paper 9 in the single recording processing (S22) or the second separate recording processing (S28) of recording the entirety of the portion of the non-code image 152 included in the passing region, the controller 8 determines whether the recording of the image 50 based on the inputted image data on the paper 9 has been completed (S29). In response to determining that the recording of the image 50 has not been completed (529: NO), the controller 8 executes conveyance processing of conveying the paper 9 in the conveyance direction by the length x of the passing region W along the conveyance direction (S30) and returns to S21 again.

In response to determining that the recording of the image 50 has been completed (S29: YES), the controller 8 executes discharge processing of discharging the paper 9 to the discharge tray 5 by the pair of discharge rollers 72 (S31). In this way, an operation of the printer 10 recording the image 50 on the paper 9 according to the second embodiment ends.

According to the present embodiment, the upstream end position in the conveyance direction of the non-code image 152 recorded in the second separate recording processing is located downstream of the upstream end in the conveyance direction of the code image 151 recorded in the first separate recording processing performed immediately before (see FIG. 6A). Therefore, when the first separate recording processing is executed, the recording start position (the downstream end position) along the conveyance direction of the code image 151 is always upstream of the upstream end in the conveyance direction of the non-code image 152 that has already been recorded on the paper 9. In this way, it is possible to further reduce the influence of the recording of the non-code image on the recording quality of the code image and secure the recording quality of the code image more reliably.

Here, a smaller number of times k of the conveyance processing is preferable to accelerate the recording speed of the image 50 on the paper 9. However, if the number of times k of the conveyance processing is decreased, the conveyance distance y in one conveyance processing along the conveyance direction of the paper 9 increases. When the conveyance distance y of the paper 9 in one conveyance processing is long, it becomes necessary to record the non-code image 152 as well as the code image 151 in a range as wide as possible along the conveyance direction of the passing region W in one pass recording operation. In this case, since the upstream end position of the code image 151 along the conveyance direction becomes close to the upstream end position of the non-code image 152 along the conveyance direction, it is not desirable from the viewpoint of securing the recording quality of the code image 151. According to the present embodiment, the conveyance distance y of the paper 9 in the conveyance processing is minimized within a range where the number of times k of the conveyance processing is minimized based on the length L1 of the code image 151 along the conveyance direction, the width x of the passing region W along the conveyance direction (the length x of the head 62 along the conveyance direction), and the distance z between the recording start position of the code image 151 and the downstream end of the passing region. In this way, it is possible to secure the recording quality of the code image while securing a recording speed above a certain level.

Third Embodiment

Next, a third embodiment will be described. Here, components having the same configurations as those in the first embodiment are designated by the same reference numerals, and the description thereof will be omitted.

Figure 8:
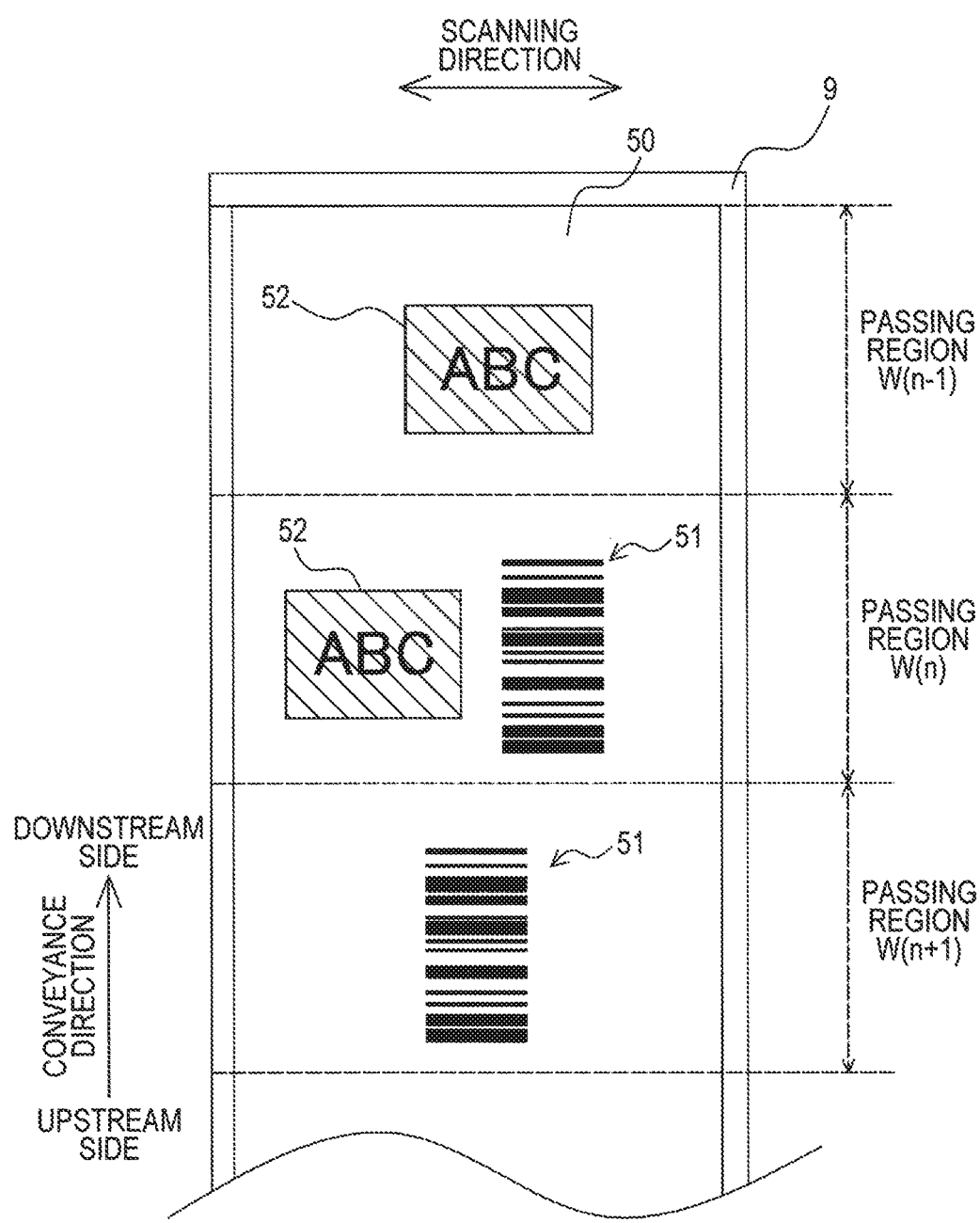
FIG. 8 is an explanatory diagram showing head passing regions W(n−1), W(n), and W(n+1) on paper.
Figure 9:
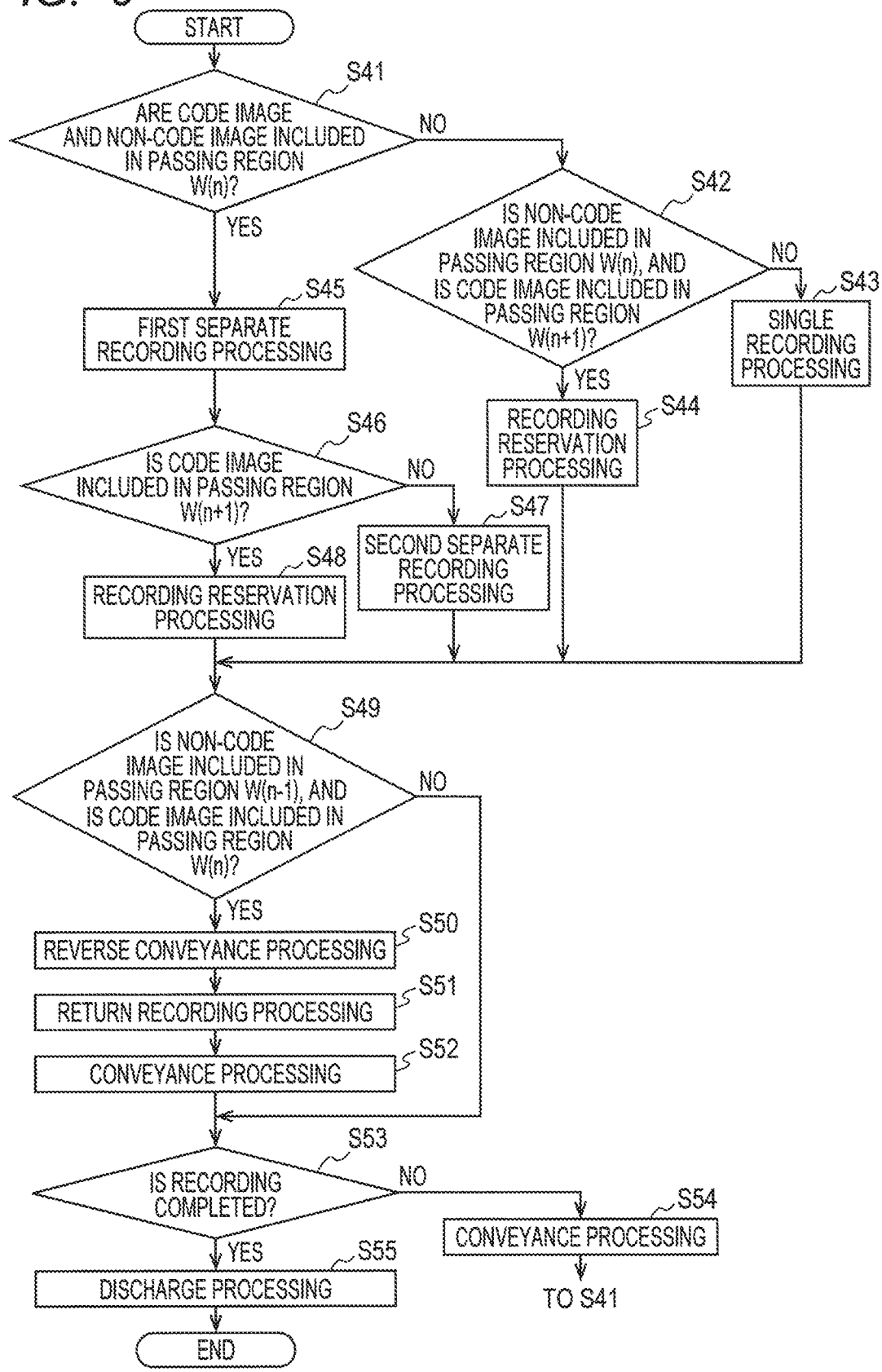
FIG. 9 is a flowchart showing the operation of an inkjet printer according to a third embodiment.

As shown in FIG. 8, when a passing region at an arbitrary position of the paper 9 is W(n), passing regions W(n+1) and W(n−1) are present adjacent to the passing region. W(n) on the upstream side and the downstream side in the conveyance direction. That is, as the paper 9 is conveyed in the conveyance direction such that the passing region of the paper 9 facing the head 62 moves from the downstream side to the upstream side, the head 62 passes the paper 9 in the order of the passing regions W(n−1), W(n), and W(n+1). In this case, the non-code image 52 recorded in the passing region W(n−1) of the paper 9 may worsen the recording quality of the code image 51 recorded in the passing region W(n). Similarly, the non-code image 52 recorded in the passing region W(n) of the paper 9 may worsen the recording quality of the code image 51 recorded in the passing region W(n+1). Therefore, in the third embodiment, the code image 51 included in a particular passing region W(n) of the paper 9 is recorded earlier than the non-code image 52 included in the passing region W(n−1) on the downstream side, and the non-code image 52 included in the passing region W(n) is recorded later than the code image 51 included in the passing region W(n+1) on the upstream side. In this way, it is possible to secure the recording quality of the code image 51 in the respective passing regions more reliably. Hereinafter, a specific example of the above-described processing will be described with reference to the flowchart of FIG. 9.

First, as shown in FIG. 8, the controller 8 executes first determination processing of determining whether both the code image 51 and the non-code image 52 are included in an image to be recorded in the passing region W(n) of the head 62 on the paper 9 (S41). In response to determining that the image to be recorded in the passing region W(n) does not include both the code image 51 and the non-code image 52 (S41: NO), the controller 8 further executes second determination processing of determining whether the non-code image 52 is included in the image to be recorded in the passing region W(n) and the code image 51 is included in an image to be recorded in the passing region W(n+1) (S42).

In response to determining that the non-code image 52 is not included in the passing region W(n) or the code image 51 is not included in the passing region W(n+1) (S42: NO), the controller 8 executes single recording processing of recording either one of the code image 51 and the non-code image 52 in the passing region W(n) of the paper 9 by performing a pass recording operation (S43). When neither the code image 51 nor the non-code image 52 is included in the passing region W(n), the recording of an image on the paper 9 is not performed, but such a case is also included in the single recording processing. In response to determining that the non-code image 52 is included in the passing region W(n) and the code image 51 is included in the passing region W(n+1) (S42: YES), the controller 8 executes recording reservation processing of reserving the recording of the non-code image 52 in the passing region W(n) of the paper 9 (S44).

In response to determining that both the code image 51 and the non-code image 52 are included in the image to be recorded in the passing region W (S41: YES), the controller 8 executes first separate recording processing of recording an entirety of the portion of the code image 51 included in the passing region W(n) on the paper 9 and not recording the non-code image 52 in the passing region W(n) of the paper 9 by performing a pass recording operation (S45). After that, the controller 8 executes second determination processing of determining whether the code image 51 is included in the image to be recorded in the passing region W(n+1) (S46).

In response to determining that the code image 51 is not included in the passing region W(n+1) (S46: NO), the controller 8 executes second separate recording processing of recording an entirety of the portion of the non-code image 52 included in the passing region W(n) of the paper 9 and not recording the code image 51 in the passing region W(n) of the paper 9 by performing a pass recording operation (S47). In response to determining that the code image 51 is included in the passing region W(n+1) (S46: YES), the controller 8 executes recording reservation processing of reserving the recording of the non-code image 52 in the passing region W(n) of the paper 9 (S48).

After any one of the single recording processing (S43), the recording reservation processing (S44 or S48), and the second separate recording processing (S47) is executed, the controller 8 determines whether the code image 51 is included in the image to be recorded in the passing region W(n) and the non-code image 52 is included in the passing region W(n−1) (S49). In response to determining that the code image 51 is included in the image to be recorded in the passing region W(n) and the non-code image 52 is included in the passing region W(n−1) (S49: YES), the controller 8 executes reverse conveyance processing of conveying the paper 9 to the position of the passing region W(n−1) in the reverse (opposite) direction of the conveyance direction (S50). In a case where the reverse conveyance processing (S50) is performed, the non-code image 52 included in the passing region W(n−1) is not recorded on the paper 9. This is because recording reservation processing of reserving the recording of the non-code image 52 in the passing region W(n−1) of the paper 9 has been performed in the recording operation in the passing region W(n−1) that is performed before the recording operation in the passing region W(n).

After the reverse conveyance processing (S50) is executed, the controller 8 executes return recording processing of recording an entirety of the portion of the non-code image 52 included in the passing region W(n−1) on the paper 9 by performing a pass recording operation (S51). The controller 8 then executes conveyance processing of conveying the paper 9 to the position of the passing region W(n) along the conveyance direction (S52).

In response to determining that the code image 51 is not included in the image to be recorded in the passing region W(n) or the non-code image 52 is not included in the image recorded in the passing region W(n−1) (S49: NO), the controller 8 does not execute the reverse conveyance processing (S50), the return recording process (S51), and the conveyance processing (S52).

After that, the controller 8 determines whether the recording of the image 50 based on the inputted image data on the paper 9 is completed (S53). In response to determining that the recording of the image is not completed (S53: NO), the controller 8 executes conveyance processing of conveying the paper 9 to the position of the passing region W(n+1) in the conveyance direction (S54) and returns to S41. After the conveyance processing (S54), the processing executed by the controller 8 is performed while replacing "n" with "n+1". For example, in the first determination processing of S41, the controller 8 determines whether both the code image 51 and the non-code image 52 are included in an image to be recorded in the passing region W(n+1) of the paper 9. In S49, the controller 8 determines whether the non-code image 52 is included in the passing region W(n) and the code image 51 is included in the passing region W(n+1).

In response to determining that the recording of the image 50 is completed (S53: YES), the controller 8 executes discharge processing of discharging the paper 9 to the discharge tray 5 by the pair of discharge rollers 72 (S55). In this way, the operation of the printer 10 recording the image 50 on the paper 9 according to the third embodiment ends.

In a case where the passing region W(n−1) is not present on the downstream side of the passing region W(n) of the head 62 on the paper 9 (that is, when the passing region W(n) is at the recording start position of the image 50), S49 to S52 are omitted. Therefore, after any one of the single recording processing (S43), the recording reservation processing (S44 or S48), and the second separate recording processing (S47) is executed, the controller 8 determines whether the recording of the image 50 based on the inputted image data on the paper 9 has been completed (S53).

According to the present embodiment, in a case where the non-code image 52 is included in the passing region W(n−1) and the code image 51 is included in the passing region W(n), the non-code image 52 is not recorded by the pass recording operation in the passing region W(n−1), and the code image 51 is recorded by the pass recording operation in the passing region W(n). After that, the paper 9 is conveyed to the position of the passing region W(n−1) in the reverse direction of the conveyance direction and the return recording processing is executed. That is, the code image 51 included in the passing region W(n) is recorded before the non-code image 52 included in the passing region W(n−1). This reduces the influence of the non-code image 52 recorded in the passing region W(n−1) on the recording quality of the code image 51 recorded in the passing region W(n) and secures the recording quality of the code image 51 more reliably. The relationship between the passing regions W(n−1) and W(n) also applies to the relationship between the passing regions W(n) and W(n+1).

While the disclosure has been described in detail with reference to the above aspects thereof, it would be apparent to those skilled in the art that various changes and modifications may be made therein without departing from the scope of the claims.

Figure 10:
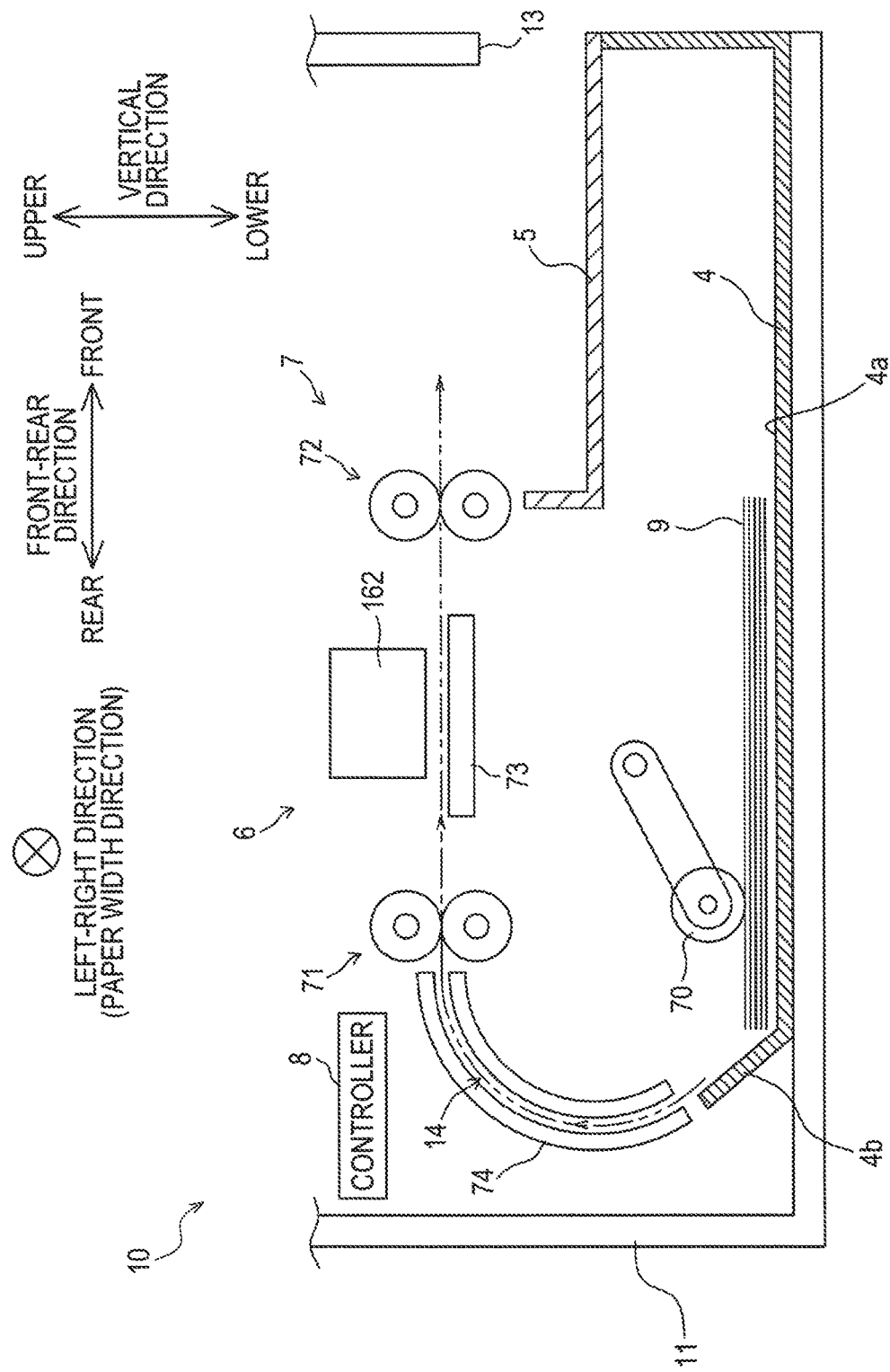
FIG. 10 is a schematic side view showing the internal structure of a printer having a line head according to a modification.

For example, in the above-described embodiments, the printer 10 is a serial printer in which the head 62 is mounted and which includes the carriage 61 reciprocating in the scanning direction along the two guide rails 65a and 65b. However, as shown in FIG. 10, the present disclosure may also be applied to a line head printer which includes a fixed head (line head) 162 having a length greater than or equal to the width of the paper 9 in the paper width direction and which records an image by discharging ink from the head 162 while conveying the paper 9 in the conveyance direction. In the line head printer, since the head 162 moves relative to the paper 9 in the conveyance direction, the passing region of the head 162 is an entire region of the paper 9. When both the code image 51 and the non-code image 52 are included in the passing region of the head 162 (that is, the paper 9), the controller 8 executes first separate recording processing of recording the code image 51 on the paper 9 while discharging ink from the head 162 while conveying the paper 9 in the conveyance direction. After that, the controller 8 executes second separate recording processing of recording the non-code image 52 on the paper 9 by discharging ink from the head 162 while conveying the paper 9 in the reverse direction of the conveyance direction.

In the second embodiment, the smallest number of times k of the conveyance processing, which minimizes the conveyance distance y, is calculated based on the length L1 of the code image 151 along the conveyance direction, the width x of the passing region W along the conveyance direction, and the distance between the downstream end of the passing region W and the recording start position of the code image 151 (see FIGS. 6A and 6B). However, the number of times k of the conveyance processing may not be the smallest number of times. The larger the number of times k of the conveyance processing, the smaller the value of the conveyance distance y in one shortened conveyance processing. When the value of the conveyance distance y is small, the non-code image 152 can be recorded in a narrower range along the conveyance direction of the passing region W. Thus, since the upstream end position of the code image 151 along the conveyance direction can be sufficiently separated from the upstream end position of the non-code image 152 along the conveyance direction, the influence of the non-code image 152 on the recording quality of the code image 151 can be reduced. However, the larger the number of times k of the conveyance processing and the smaller the value of the conveyance distance y, the slower the speed of recording the entire image 50. Therefore, it is preferable that either one of the recording quality and the recording speed can be set to be prioritized appropriately according to the user's needs. Further, the conveyance distance y may be a conveyance distance other than the smallest conveyance distance within the range where the number of times k of the shortened conveyance processing is the smallest number of times, instead of the smallest conveyance distance within the range of the smallest number of times.

In the second and third embodiments, the controller S may derive the distance d between the code image 51 and the non-code image 52 according to distance derivation processing before the first separate recording processing is executed and may determine whether the distance d is smaller than a particular value. In this case, the first separate recording processing is executed when the distance d is smaller than the particular value and the non-separate recording processing is executed when the distance d is larger than or equal to the particular value. The controller 8 may execute the landing amount determination processing of determining whether there are a particular number or more of first sections 52a in which an ink landing amount is larger than or equal to a particular amount among a plurality of sections forming the non-code image 52 recorded in the passing region W before executing the first separate recording processing. In this case, the first separate recording processing is executed when the number of first sections 52a is larger than or equal to the particular number, and the non-separate recording processing is executed when the number is smaller than the particular number. In the above-described embodiments, the processing of determining whether the distance d is smaller than the particular distance and the processing of determining whether the number of first sections 52a is larger than or equal to the particular number may be executed together, or only one of them may be executed.

In the third embodiment, the controller 8 executes recording reservation processing of reserving the recording of the non-code image 52 in the passing region W(n) of the paper 9. However, in the recording reservation processing, the controller 8 may record a portion of the non-code image 52 on the downstream side of the passing region W(n) on the paper 9 without recording the remaining portion on the upstream side on the paper 9. In this case, the shorter the length along the conveyance direction of the non-code image 52 recorded on the portion of the downstream side of the passing region W(n), the smaller the influence that the non-code image 52 recorded in the passing region W(n) has on the recording quality of the code image 51 recorded in the passing region W(n+1). In this case, in the return recording processing of S51, the remaining portion of the non-code image 52 on the upstream side of the passing region W(n), for which the recording is reserved in the recording reservation processing, is recorded on the paper 9.

In the third embodiment, by considering the concern of a deterioration in the recording quality of the code image 51 to be recorded in the passing region W(n), which may be caused by the non-code image 52 to be recorded in the passing region W(n−1) of the paper 9, the non-code image 52 is recorded in the passing region W(n−1) after the code image 51 is recorded in the passing region W(n). As a modification, the influence of the non-code image 52 recorded in the passing regions W(n−1) and W(n−2) may be taken into consideration. That is, the non-code image 52 may be recorded in the passing regions W(n−1) and W(n−2) after the code image 51 is recorded in the passing region W(n). The non-code image 52 recorded in the passing region W(n−3) and farther downstream passing region(s) may be considered.

In the first to third embodiments described above, the controller 8 provided in the printer 10 executes the first and second determination processing, the first and second separate recording processing, the non-separate recording processing, the distance derivation processing, the landing amount determination processing, the return recording processing, and so on. However, the present disclosure is not limited to this. For example, a printer driver installed in the HDD of the PC 20 or the ROM of a mobile terminal connected to the printer 10 may cause the PC 20 or the mobile terminal to execute some or all of the processing.

In the first embodiment described above, at least one of step S3 and step S5 may be omitted. Further, in the above-described embodiments, the present disclosure is applied to the printer 10, but the present disclosure is not limited to this. The present disclosure can also be applied to any inkjet recording apparatus that ejects ink from a head, such as a multifunction peripheral and a copier.

What is claimed is:

1. An inkjet recording apparatus comprising:
a head configured to eject ink onto a recording medium;
a conveyor configured to convey the recording medium in a first direction;
a carriage on which the head is mounted, the carriage being configured to reciprocate in a second direction perpendicular to the first direction;
a motor configured to drive the carriage to reciprocate in the second direction such that the head moves relative to the recording medium while facing the recording medium;
a memory; and
a controller configured to:
determine, based on image data stored in the memory, whether both a code image and a non-code image are included in an image to be recorded in a passing region of the recording medium, the passing region being a region through which the head passes due to a relative movement of the head, the code image being formed by a plurality of recorded regions and a plurality of non-recorded regions, the non-code image being an image other than the code image; and
in response to determining that both the code image and the non-code image are included in the image,
during a first relative movement of the head, perform first separate recording processing of controlling the head and the motor to record at least part of a portion of the code image included in the passing region without recording a portion of the non-code image included in the passing region; and
during a second relative movement of the head which is performed after the first relative movement, perform second separate recording processing of controlling the head and the motor to record at least part of the portion of the non-code image included in the passing region without recording the portion of the code image included in the passing region.

2. The inkjet recording apparatus according to claim 1, wherein the controller is configured to:
- in response to determining that both the code image and the non-code image are included in the image, determine, based on the image data, a distance between the code image and the non-code image included in the image to be recorded in the passing region;
- in response to determining that the distance is smaller than a particular distance, perform the first separate recording processing and the second separate recording processing; and
- in response to determining that the distance is larger than or equal to the particular distance, perform non-separate recording processing of controlling the head and the motor to record both at least part of a portion of the code image included in the passing region and at least part of a portion of the non-code image included in the passing region during one relative movement of the head.

3. The inkjet recording apparatus according to claim 1, wherein the controller is configured to:
- in response to determining that both the code image and the non-code image are included in the image, determine, based on the image data, whether a number of high-duty sections is larger than or equal to a particular number, the high-duty sections being sections in which a landing amount of ink ejected from the head is larger than or equal to a particular amount among a plurality of sections forming the non-code image recorded in the passing region;
- in response to determining that the number of the high-duty sections is larger than or equal to the particular number, perform the first separate recording processing and the second separate recording processing; and
- in response to determining that the number of the high-duty sections is smaller than the particular number, perform non-separate recording processing of controlling the head and the motor to record both at least part of a portion of the code image included in the passing region and at least part of a portion of the non-code image included in the passing region during one relative movement of the head.

4. The inkjet recording apparatus according to claim 1, wherein the controller is configured to:
- perform conveyance processing of controlling the conveyor to convey the recording medium in the first direction after performing the first separate recording processing and the second separate recording processing;
- repeatedly perform the first separate recording processing, the second separate recording processing, and the conveyance processing until recording on the recording medium is completed; and
- in each of the first separate recording processing and the second separate recording processing, perform a pass recording operation of, while moving the carriage in the second direction, ejecting ink from the head mounted on the carriage.

5. The inkjet recording apparatus according to claim 4, wherein the controller is configured to:
- determine whether both the code image and the non-code image are included in an image to be recorded in the passing region through which the head passes in one pass recording operation.

6. The inkjet recording apparatus according to claim 5, wherein the controller is configured to:
- control the conveyor such that a conveyance distance of the recording medium in the first direction is equal to a distance corresponding to a length of the head in the first direction; and
- in response to determining that both the code image and the non-code image are included in the image to be recorded in the passing region through which the head passes in the one pass recording operation, record an entirety of the portion of the code image included in the passing region in the first separate recording processing, and record an entirety of the portion of the non-code image included in the passing region in the second separate recording processing.

7. The inkjet recording apparatus according to claim 5, wherein the controller is configured to:
- control the conveyor such that a conveyance distance of the recording medium in the first direction is shorter than a length of the head in the first direction; and
- in response to determining that both the code image and the non-code image are included in the image to be recorded in the passing region through which the head passes in the one pass recording operation,
  - in the first separate recording processing, record a first particular portion, the first particular portion being an unrecorded portion of the code image included in the passing region; and
  - in the second separate recording processing, record a second particular portion, the second particular portion being at least part of an unrecorded portion of the non-code image included in the passing region, the second particular portion being recorded such that an upstream-end position of the second particular portion in the first direction is located downstream of an upstream-end position of the first particular portion recorded in the first separate recording processing that is performed immediately before the second separate recording processing.

8. The inkjet recording apparatus according to claim 7, wherein the controller is configured to minimize the conveyance distance in the conveyance processing within a range that a number of times of the conveyance processing performed from a start of recording of the code image until an end of the recording of the code image is a minimum number of times, the minimum number of times being determined based on a length of the code image in the first direction and on a length of the head in the first direction.

9. The inkjet recording apparatus according to claim 4, wherein the controller is configured to:
- determine, based on the image data, whether the non-code image is included in an image to be recorded in a passing region through which the head passes during a third relative movement of the head and whether the code image is included in an image to be recorded in a passing region through which the head passes during a fourth relative movement of the head, the fourth relative movement being performed after at least one conveyance processing after the third relative movement;
- in response to determining that the non-code image is included in the image to be recorded during the third relative movement and that the code image is included in the image to be recorded during the fourth relative movement, perform return recording processing of controlling the head, the motor, and the conveyor to:
  - during the third relative movement, not record at least part of a portion of the non-code image included in the passing region;

during the fourth relative movement, record a portion of the code image included in the passing region;

after the fourth relative movement, convey the recording medium reversely to a same position at which the third relative movement is performed; and during a fifth relative movement of the head after the recording medium is conveyed reversely to the same position, record the at least part of the portion of the non-code image included in the passing region.

10. A recording method in an inkjet recording apparatus, comprising:

determining, based on image data stored in a memory of the inkjet recording apparatus, whether both a code image and a non-code image are included in an image to be recorded in a passing region of a recording medium, the inkjet recording apparatus including a head configured to eject ink onto the recording medium and a movement mechanism configured to cause at least the head or the recording medium to reciprocate in one direction such that the head moves relative to the recording medium while facing the recording medium, the passing region being a region through which the head passes due to a relative movement of the head, the code image being formed by a plurality of recorded regions and a plurality of non-recorded regions, the non-code image being an image other than the code image; and in response to determining that both the code image and the non-code image are included in the image, during a first relative movement of the head, performing first separate recording processing of controlling the head and the movement mechanism to record at least part of a portion of the code image included in the passing region without recording a portion of the non-code image included in the passing region; and during a second relative movement of the head which is performed after the first relative movement, performing second separate recording processing of controlling the head and the movement mechanism to record at least part of the portion of the non-code image included in the passing region without recording the portion of the code image included in the passing region.

* * * * *